United States Patent
Gilbert-Eyres et al.

(10) Patent No.: US 10,525,934 B1
(45) Date of Patent: Jan. 7, 2020

(54) INTEGRATED SILENT VEHICLE ALARM

(71) Applicant: GM GLOBAL TECHNOLOGY OPERATIONS LLC, Detroit, MI (US)

(72) Inventors: Matthew E. Gilbert-Eyres, Rochester Hills, MI (US); Matt Neely, Rochester, MI (US); Eric T. Hosey, Royal Oak, MI (US); Huong T. Chim, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/201,684

(22) Filed: Nov. 27, 2018

(51) Int. Cl.
*B60R 25/104* (2013.01)
*B60R 25/23* (2013.01)
*B60R 25/20* (2013.01)
*B60R 25/10* (2013.01)

(52) U.S. Cl.
CPC ............ *B60R 25/104* (2013.01); *B60R 25/23* (2013.01); *B60R 25/2045* (2013.01); *B60R 25/2054* (2013.01); *B60R 2025/1013* (2013.01)

(58) Field of Classification Search
CPC .............................. B60R 25/104; B60R 25/23
USPC ....................................................... 340/426.1
See application file for complete search history.

(56) References Cited

U.S. PATENT DOCUMENTS

| | | | |
|---|---|---|---|
| 6,791,046 B1* | 9/2004 | King | H01H 9/08 174/520 |
| 2007/0075849 A1* | 4/2007 | Pitt | B60R 25/102 340/426.2 |
| 2014/0039723 A1* | 2/2014 | Miller | B60K 35/00 701/2 |
| 2014/0240111 A1* | 8/2014 | Kleve | G08B 25/016 340/426.18 |

OTHER PUBLICATIONS

U.S. Appl. No. 16/003,742, "System and Method to Securely Activate a Vehicle", filed Jun. 8, 2018, 30 pages.

* cited by examiner

*Primary Examiner* — Kerri L McNally
(74) *Attorney, Agent, or Firm* — Reising Ethington P.C.; David Willoughby

(57) ABSTRACT

A system and method for triggering a silent alarm notification in the event the vehicle occupant comes under attack and needs to discretely signal for help. The system includes an integrated silent vehicle alarm that is triggered by the vehicle occupant by entering a pre-programmed silent alarm sequence. The silent alarm sequence is entered using OEM-installed manually actuatable devices such as door or steering wheel switches located within the vehicle. These manually actuatable devices have dual functions: a primary vehicle related function (such as opening/closing a window) and a secondary function as input devices for the silent alarm sequence. In this way the silent alarm signal utilizes devices already present in the vehicle and requires no new installation or placement of new devices. The silent alarm notification is wirelessly sent to a remote facility for vehicle tracking and emergency response.

8 Claims, 3 Drawing Sheets

INTEGRATED SILENT VEHICLE ALARM

INTRODUCTION

The present invention relates to user-triggerable vehicle alarms.

Vehicle alarm systems are typically used to provide an audible alarm and visible alert to gain the attention of others nearby so as to help ward off vehicle theft or damage. These alarm systems are designed to emit a loud alarm in response to some predetermined event occurs, such as a window shattering or a door being opened. Often, these alarms are also triggerable by the vehicle operator using a key fob. The audible alarm is designed to scare the perpetrator away and to attract the attention of those within the vicinity of the vehicle to a possible crime. However, these audible alarms are not always appropriate to prevent harm to the vehicle occupant if they happen to be present during a theft. In instances when vehicle occupants are present, such as a car-jacking, kidnapping, or robbery, an audible alarm may actually escalate the situation and put the victim in jeopardy of greater harm.

SUMMARY

According to one aspect of the invention, there is provided a method of triggering a silent vehicle alarm by an occupant of a vehicle having original equipment manufacturer (OEM)-installed vehicle electronics that include a plurality of manually actuatable input devices, each of which has a primary control function for carrying out an associated primary vehicle function. The method comprises the steps of: (a) storing in the vehicle electronics a silent alarm sequence that triggers the silent vehicle alarm, the silent alarm sequence comprising a predetermined sequence of activations of one or more of the manually actuatable input devices; and subsequently, during use of the vehicle by a vehicle occupant: (b) receiving an input sequence from the vehicle occupant using the one or more manually actuatable input devices; (c) comparing the received input sequence to the silent alarm sequence; and (d) in response to determining that the received input sequence matches the silent alarm sequence, then wirelessly transmitting a silent alarm notification from the vehicle using the vehicle electronics; wherein each of the one or more manually actuatable input devices of the OEM-installed vehicle electronics that are used to receive the silent alarm sequence provides a dual function of enabling the vehicle occupant to carry out the primary vehicle function associated with the manually actuatable input device and enabling the vehicle occupant to enter the silent alarm sequence.

According to various embodiments, this method may further include any one of the following features or any technically feasible combination of some or all of these features:
- receiving, after customer delivery of the vehicle, an alarm setting command from a vehicle user, followed by receiving the silent alarm sequence from the vehicle user via the one or more manually actuatable input devices;
- the one or more manually actuatable input devices comprise one or more manually manipulatable input devices selected from the group consisting of: door mounted switches, seat mounted switches, dashboard mounted switches, steering column mounted switches, steering wheel mounted switches, center console mounted switches, or pedal switches, and wherein the silent alarm sequence comprises a predetermined sequence of activations of one or more of the switches;
- the silent alarm sequence comprises a predetermined sequence of activations of two or more of the switches;
- the one or more manually actuatable input devices includes a microphone, vehicle interior camera, and/or a gesture input device within the vehicle, and wherein the predetermined sequence of activations comprises physical movement or sound from the vehicle occupant that is detected using the microphone, vehicle interior camera, and/or the gesture input device;
- step (d) further comprises wirelessly providing location data indicative of the vehicle's location and vehicle identification information that uniquely identifies the vehicle;
- further comprising, after step (d), providing the vehicle occupant with a confirmatory indicator that the silent vehicle alarm was transmitted or was transmitted and successfully received by a remote facility, the confirmatory indicator comprising a predetermined visible, audible, or tactile notification that is substantially unnoticeable from outside the vehicle.

According to another aspect of the invention, there is provided a vehicle having original equipment manufacturer (OEM)-installed vehicle electronics that include a vehicle system module having an electronic processor and memory that is accessible by the processor and that stores a computer program for execution by the processor, the vehicle electronics further including a plurality of manually actuatable input devices, each of which has a primary control function for carrying out an associated primary vehicle function and each of which provides an input that is received by the vehicle system module, wherein the vehicle system module is configured to execute the computer program using the processor so as to: (a) store in the vehicle electronics a silent alarm sequence that triggers a silent vehicle alarm, the silent alarm sequence comprising a predetermined sequence of activations of one or more of the manually actuatable input devices; and subsequently, during use of the vehicle by a vehicle occupant: (b) receive an input sequence from the vehicle occupant using the one or more manually actuatable input devices; (c) compare the received input sequence to the silent alarm sequence; and (d) in response to determining that the received input sequence matches the silent alarm sequence, then wirelessly transmit a silent alarm notification from the vehicle using the vehicle electronics; wherein each of the one or more manually actuatable input devices of the OEM-installed vehicle electronics that are used to receive the silent alarm sequence provides a dual function of enabling the vehicle occupant to carry out the primary vehicle function associated with the manually actuatable input device and enabling the vehicle occupant to enter the silent alarm sequence.

According to another aspect of the invention, there is provided a non-transitory computer-readable storage medium storing a computer program executable by an electronic processor of a vehicle system module that is part of original equipment manufacturer (OEM)-installed vehicle electronics, wherein the vehicle electronics include a plurality of manually actuatable input devices, each of which has a primary control function for carrying out an associated primary vehicle function, and wherein the computer program comprises computer readable instructions that configure the processor to: (a) store in the vehicle electronics a silent alarm sequence that triggers a silent vehicle alarm, the silent alarm sequence comprising a predetermined sequence of activations of one or more of the manually actuatable input devices; and subsequently, during use of the vehicle by a vehicle occupant: (b) receive an input sequence from the vehicle occupant using the one or more manually actuatable input devices; (c) compare the received input sequence to the silent alarm sequence; and (d) in response to determining that the received input sequence matches the silent alarm sequence, then wirelessly transmit a silent alarm notification from the vehicle using the vehicle electronics; whereby each of the one or more manually actuatable input devices of the OEM-installed vehicle electronics that are used to receive the silent alarm sequence provides a dual function of enabling the vehicle occupant to carry out the primary vehicle function associated with the manually actuatable input device and enabling the vehicle occupant to enter the silent alarm sequence.

BRIEF DESCRIPTION OF THE DRAWINGS

One or more embodiments of the invention will hereinafter be described in conjunction with appended drawings, wherein like designations denote like elements, and wherein.

DETAILED DESCRIPTION

Figure 1:
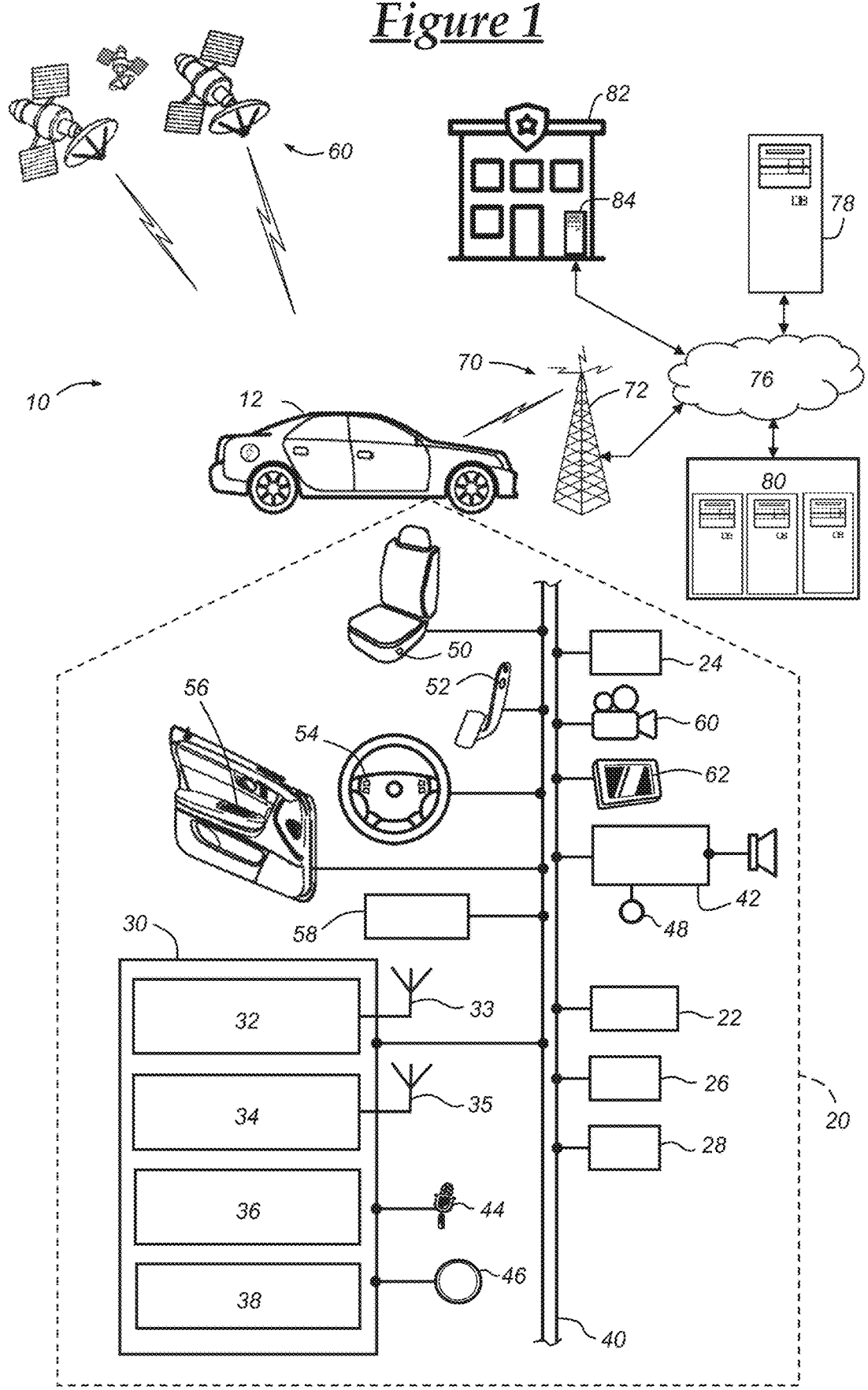
FIG. 1 is a block diagram depicting an embodiment of a communications system that is capable of utilizing the methods disclosed herein.

The system and methods described below enable a vehicle occupant to store a silent alarm sequence for the purpose of later entering it in case of an emergency to thereby trigger a silent vehicle alarm using OEM installed vehicle electronics. This allows a vehicle occupant who is under attack or in danger to send a silent alarm signal for help to a call center without alerting the assailant to the fact that the alarm signal has been sent. Such an instance may arise if the vehicle occupant is a victim of a crime such as car-jacking, robbery, kidnapping, or an escalated instance of road rage. Typically, in these instances a victim is not able to simply pull out a phone and call 9-1-1. And, setting off a loud audible or visible alarm may only intensify the danger. Triggering the silent alarm may be done using one or more manually actuatable input devices such as any of the various switches mounted on the driver door, steering wheel, vehicle seat, etc. Such pre-existing manually actuatable input devices have a primary control function associated with a primary vehicle function. The silent alarm sequence may be pre-entered by the OEM during vehicle manufacturing or by the customer or other vehicle user following delivery of the vehicle. The silent alarm sequence can be entered by manually manipulating input devices or it can be entered using physical movements that are detected by vehicle interior cameras or gesture input devices. The vehicle occupant may be provided with a subtle indicator or confirmatory indicator, to notify him/her that the silent alarm sequence was successfully entered and/or was sent wirelessly to a central facility that is able to track the vehicle and/or dispatch emergency services. This approach provides an improvement over conventional vehicle alarms which allows a vehicle occupant to discretely trigger and send a silent signal for help using pre-existing devices within the vehicle without the need for new devices or installation of new parts. The use of pre-existing vehicle devices helps to reduce cost and avoids the problem of having to create a new location to house a new input device.

In one embodiment, the method can be used for triggering a silent vehicle alarm by an occupant of a vehicle having original equipment manufacturer (OEM)-installed vehicle electronics that include a plurality of manually actuatable input devices, each of which has a primary control function for carrying out an associated primary vehicle function. These manually actuatable input devices can be buttons located on the door or door handles such as door mounted switches for windows, seat mounted switches for positioning the seat, side view mirror buttons or switches, switches or buttons for adjusting the steering column, cruise control and other such buttons or switches located on the steering wheel, buttons and switches located on the center console or instrument panel, brake pedal, gas pedal, turn signal switch, and any other such devices located within the passenger cabin of the vehicle. Other such buttons or switches may also include touch or proximity sensors such as touchscreens or capacitive proximity sensors. All of these manually actuatable input devices (buttons, switches including touch screens and proximity sensors, and pedals) have a primary function associated with them such as raising or lowering windows, adjusting seat height etc., as part of the silent alarm system they have a second function of enabling the vehicle occupant to enter the silent alarm sequence and triggering the silent alarm. Therefore, the system is highly efficient in that it creates dual functions for already existing devices within the vehicle. The benefit is twofold, as no new devices need to be added to the vehicle and no physical redesign needs to occur in order to incorporate new devices. Therefore, time and money are saved by using pre-existing manually actuatable devices that already have a primary function within the vehicle.

With reference to FIG. 1, there is shown an operating environment that comprises a communication system 10 that can be used to implement a method 200 discussed below in connection with FIG. 2. The communications system 10 may be used to transmit a silent alarm notification that allows a vehicle occupant to silently and discreetly transmit an emergency signal when under attack while in the vehicle. The communications system 10 generally includes a vehicle 12 with a wireless communications device 30, a constellation of satellites 60, a wireless carrier system 70, a land communications network 76, a computer 78, a remote facility 80, and a public safety answering point (PSAP) 82. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of a type of the vehicle communications system 10; however, other systems not shown here could employ the disclosed method as well.

The remote facility 80 may be a single or distributed central facility that provides one or more servers (i.e., computing devices) that may be used to provide back end system support for the silent vehicle alarm method described herein. This can include some or all of the back end support functions for the vehicle 12, including receipt of the silent alarm signal, tracking of vehicle location, and remotely triggered disabling of the vehicle or certain vehicle functions remotely (such as to slow down/stop the vehicle to help prevent its theft or carjacking of the occupant). The remote facility 80 may communicate with the PSAP 82, which may be a physical location where emergency responders are located or from which they are dispatched. The facility 80 may provide the PSAP 82 with a notification that the silent vehicle alarm has been triggered for purposes of emergency services dispatch, and provide the PSAP 82 with the vehicle location that may be continuously updated as it changes for purposes of tracking, police intervention, etc. The remote facility 80 may also provide PSAP 82 with control over remote disabling of the vehicle. Techniques for remotely signaling a vehicle to slow down and/or stop regardless of driver input are known to those skilled in the art. Apart from communication with the vehicle 12 and PSAP 82, the remote facility 80 may be used to provide other back end services such as associating the vehicle 12 with one or more user accounts, as well as the storage of silent alarm sequences received from vehicle occupants, if necessary or desired. Further details of the remote facility 80 and PSAP 82 are described below.

To enable wireless communication between the vehicle 12 and computer 78, remote facility 80, PSAP 82, etc., the communication system 10 includes a cellular and land communication infrastructure that includes the wireless carrier system 70 and land network 76. The wireless carrier system 70 may be any of one or more suitable cellular telephone systems. The carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect the wireless carrier system 70 with the land network 76 or to connect the wireless carrier system 70 with user equipment (UE) (e.g., the wireless communications device 30). The wireless carrier system 70 can implement any suitable communications technology, including for example GSM/GPRS technology, CDMA or CDMA2000 technology, LTE technology, etc. In general, the wireless carrier systems 70, their components, the arrangement of their components, the interaction between the components, etc. is generally known in the art.

Apart from using the wireless carrier system 70, a different wireless carrier system in the form of satellite communication can be used to provide uni-directional or bi-directional communication with the server and vehicle telematics system. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle occupant and the uplink transmitting station. By way of example the bi-directional communication can be used to transmit the silent alarm notification and vehicle location, just to name a few. If used, this satellite telephony can be utilized either in addition to or in lieu of the wireless carrier system 70.

The land network 76 may be a conventional land-based telecommunications network that is connected to one or more landline telephones and connects the wireless carrier system 70 to the remote facility 80. For example, the land network 76 may include a public switched telephone network (PSTN) such as that used to provide hardwired telephony, packet-switched data communications, and/or the Internet infrastructure. One or more segments of the land network 76 could be implemented through the use of a standard wired network, a fiber or other optical network, a cable network, power lines, other wireless networks such as wireless local area networks (WLANs), networks providing broadband wireless access (BWA), or any combination thereof.

The computer 78 can be one or more computers (only one shown) accessible via a private or public network such as the Internet. Each such computer 78 can be used for one or more purposes, such as a web server accessible by the vehicle 12. The other such accessible computers 78 can be, for example: a service center computer where diagnostic information and other vehicle data can be uploaded from the vehicle; a client computer used by the vehicle owner or a subscriber/driver for such purposes as controlling vehicle functions, or providing quantified assessments whether by communicating with the vehicle and/or the remote facility 80. The computer 78 can also be used for providing Internet connectivity such as DNS services or as a network address server that uses DHCP or other suitable protocol to assign an IP address to the car sharing vehicle.

The remote facility 80 may be designed to provide the vehicle with a number of different system back-end functions. For example, the remote facility 80 may be used in part to provide the confirmatory indicator upon receipt of the silent alarm signal and to relay a notification to PSAP 82, as well as vehicle location, vehicle owner information, etc. In such a case, the remote facility 80 may coordinate with emergency responders, and/or provide authentication and authorization data to SRWC devices, users, and/or vehicles. The remote facility 80 may include one or more switches, servers, databases, live advisors, as well as an automated voice response system (VRS), all of which are known in the art. The remote facility 80 may include any or all of these various components, and preferably, each of the various components are coupled to one another via a wired or wireless local area network. The remote facility 80 may receive and transmit data via a modem connected to the land network 76. A database at the remote facility 80 can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility 80 can instead utilize a VRS as an automated advisor or, a combination of the VRS and the live advisor can be used. Information or data stored at the remote facility 80 can be sent to one or more vehicles or other devices to carry out numerous functions and services. The vehicle can send data or information to the remote facility 80, which can then store such information.

The PSAP 82 can be a stationary facility where emergency responders are located such as a police station, 9-1-1 call center, fire station or any other location. The PSAP 82 can include other electronics, such as a computer 84 that can be used to communicate with other devices or components of system 10, including the remote facility 80 and the vehicle 12. The computer 84 can be a fixed computer connected for public or private network access via a wired or wireless communication path. Thus, through use of the computer the PSAP 82 may be able to communicate with the computer 78, remote facility 80, and/or vehicle 12 to exchange information and send control commands (e.g., a vehicle disable signal), including notifications, access credentials, and commands for carrying out the methods described herein.

The vehicle 12 is depicted in the illustrated embodiment as a passenger car, but it should be appreciated that any other vehicle including trucks, sports utility vehicles (SUVs), recreational vehicles (RVs), etc., can also be used. As principally relevant herein, the vehicle 12 includes vehicle electronics 20 that are original equipment manufacturer (OEM)-installed electronics added to the vehicle when it is built. The vehicle electronics 20 are used to carry out various functions of the vehicle and its various systems, and are used at least in part to carry out the integrated silent vehicle alarm method described below. And, while the embodiment described herein utilizes vehicle electronics 20 that are all OEM-installed, in other embodiments, some portions of the vehicle electronics used to carry out the silent vehicle alarm method may be OEM-installed and other portions of the vehicle electronics may be added later by a dealer or as an aftermarket accessory, such as a vehicle telematics unit that permits wireless communication to and from the vehicle over a cellular or other wireless network.

Some of the vehicle electronics 20 are shown generally in FIG. 1 and include a global navigational satellite system (GNSS) receiver 22, an integrated silent vehicle alarm (SVA) module 24, a body control module (BCM) 26, and one or more other vehicle system modules (VSMs) 28, all of which may be connected to a wireless communications device 30 via a communications bus 40. The communications bus 40 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and/or IEEE standards and specifications, to name but a few.

GNSS receiver 22 receives radio signals from a constellation of the GNSS satellites 60. From these signals, the receiver 22 can determine the position of the vehicle 12 in a known manner. The GNSS receiver 22 can provide this location data to the wireless communications device 30 for various purposes, including remote vehicle tracking which may be done by sending the vehicle location data to computer 78, remote facility 80, PSAP 82, or other remote system. In this way, instantaneous vehicle location and tracking may be performed as a part of the integrated silent vehicle alarm method described herein. Additionally, the GNSS receiver 22 may be used for other location-based services, such as to provide navigation and other position-related services to the vehicle operator. Navigation information can be presented on a display 62 (or other display within the vehicle) or can be presented verbally such as is done when supplying turn-by-turn navigation. The navigation services can be provided using a dedicated in-vehicle navigation module (which can be part of the GNSS receiver 22), or some or all navigation services can be done via the wireless communications device 30 installed in vehicle 12, wherein the position information is sent to a remote location for purposes of providing the vehicle 12 with navigation maps, map annotations (points of interest, charging facility, etc.), route calculations, and the like. The position information can be supplied to the remote facility 80 or other remote computer system, such as the computer 78, for other purposes. Also, new or updated map data can be downloaded to the GNSS receiver 22 from the remote facility 80 via a vehicle wireless communications device 30.

The integrated silent vehicle alarm (SVA) 24 is a vehicle system module that may be used to carry out the steps of the silent vehicle alarm method 200 that occur at the vehicle 12. Although shown as a separate module, it may be integrated in with one or more other vehicle system modules, such as the body control module (BCM) 26, the wireless communications device 30, or some other system. SVA 24 includes an electronic processor and computer-readable memory that is accessible by the processor. The memory may be a computer-readable medium that stores a computer program having instructions which, when executed by the processor, performs various steps of the method 200, including monitoring for entry of a silent alarm sequence, triggering of the silent alarm in response to detecting the sequence, and initiating the transmission of a silent alarm notification to the remote facility 80, PSAP 82, or elsewhere. Suitable memory may include non-transitory computer-readable memory that includes various forms of non-volatile RAM and ROM.

The body control module (BCM) 26 is shown in the exemplary embodiment of FIG. 1 as being electrically coupled to communication bus 28. In some embodiments, the BCM 26 may be integrated with or part of a center stack module (CSM) and/or integrated with wireless communications device 30. Or, the BCM 26 may be a separate device that is connected to other VSMs via bus 40. BCM 26 can include a processor and memory, which can be similar to that discussed above for SVA module 24. BCM 26 may communicate with wireless device 30 and/or one or more vehicle system modules, such as an engine control unit (ECU) (not shown), GNSS receiver 22, or other VSMs 28. BCM 26 may include a processor and memory accessible by the processor. Software stored in the BCM 26 enables it to direct one or more vehicle operations including, for example, controlling central locking, air conditioning, power mirrors, controlling the vehicle primary mover (e.g., engine, primary propulsion system), and/or controlling various other vehicle modules. For example, the BCM 26 can send signals to other VSMs, such as a request for sensor information. And, the BCM 26 may receive data from VSMs, including sensor readings or sensor data from various VSMs 28.

Additionally, BCM 26 may provide vehicle state information corresponding to the vehicle state or of certain vehicle components or systems. For example, the BCM may provide the device 30 with information indicating whether the vehicle's ignition is turned on, the gear the vehicle is presently in (i.e., gear state), and/or other information regarding the vehicle. The BCM 26 can obtain information from one or more other vehicle modules to obtain this information. Moreover, as mentioned above, the BCM 26 can be used to carry out a variety of vehicle operations; for example, initiating or booting the wireless communications device 30 or the other VSM, starting the ignition or primary propulsion system, heating or cooling passenger seats included in the vehicle 12, performing air conditioning or heating of the vehicle 12 cabin, turning off/on or flashing headlights or other lights included in the vehicle 12, emitting an audible sound using the vehicle 12 horn or speakers, downloading information (e.g., information pertaining to the vehicle's system) or content data (e.g., audio/video playlists or files) from the remote facility 80 or the computer 78 (including information that may be particular to the user of an SRWC device and/or associated with an SRWC device), downloading or uploading information and/or content data from or to the SRWC device, and/or performing various other operations of the vehicle 12, many of which are described herein.

The wireless communications device (or wireless communications transceiver) 30 includes a short-range wireless communications (SRWC) circuit or chipset 32, a cellular chipset 34, a processor 36, memory 38, and/or antennas 33 and 35 (e.g., a single antenna, dual antenna, or any appropriate number of antennas). In other embodiments, the cellular chipset 34 may be included in a separate vehicle module, such as a separate telematics unit. The wireless communications device 30 can be an OEM-installed (embedded) or aftermarket device that is installed in the vehicle 12 and that enables wireless voice and/or data communication over the wireless carrier system 70 and via wireless networking. This enables the vehicle 12 to communicate with the remote facility 80, other telematics-enabled vehicles, or some other entity or device. The wireless communications device 30 can use radio transmissions to establish a communications channel (a voice channel and/or a data channel) with the wireless carrier system 70 so that voice and/or data transmissions can be sent and received over the channel. By providing both voice and data communication, the wireless communications device 30 enables the vehicle to offer a number of different services including those related to vehicle usage assessment, navigation, car sharing, telephony, emergency assistance, diagnostics, infotainment, etc. Data can be sent either via a data connection, such as via packet data transmission over a data channel or via a voice channel using techniques known in the art. For combined services that involve both voice communication and data communication, the system can utilize a single call over a voice channel and switch as needed between voice and data transmission over the voice channel, and this can be done using techniques known to those skilled in the art.

According to one embodiment, the wireless communications device 30 utilizes cellular communication according to either GSM, CDMA, or LTE standards and, thus, includes the standard cellular chipset 34 for voice communications like hands-free calling, a wireless modem for data transmission and a dual antenna 35. It should be appreciated that the modem can either be implemented through software that is stored in the wireless communications device and is executed by the processor 36, or it can be a separate hardware component located internal or external to the wireless communications device 30. The modem can operate using any number of different standards or protocols such as LTE, EVDO, CDMA, GPRS, and EDGE. Wireless networking between the vehicle and other networked devices can also be carried out using the wireless communications device 30. For this purpose, the wireless communications device 30 may use the SRWC circuit 32 to communicate wirelessly according to one or more wireless protocols, including SRWC such as any of the IEEE 802.11 protocols, WiMAX, ZigBee™, Wi-Fi™ direct, Bluetooth™ Bluetooth™ Low Energy (BLE), or near field communication (NFC). When used for packet-switched data communication such as TCP/IP, the wireless communications device can be configured with a static IP address or can set up to automatically receive an assigned IP address from another device on the network such as a router or from a network address server.

The processor 36 can be any type of device capable of processing electronic instructions including microprocessors, microcontrollers, host processors, controllers, vehicle communication processors, and application specific integrated circuits (ASICs). It can be a dedicated processor used only for the wireless communications device 30 or can be shared with other vehicle systems. The processor 36 executes various types of digitally-stored instructions, such as software or firmware programs stored in the memory 38, which enable the wireless communications device to provide a wide variety of services. For instance, the processor 36 can execute programs or process data to carry out at least a part of the method discussed herein. The processor of SVA 24 may be the same or similar to processor 36.

In some embodiments, the wireless communications device 30 can be used to provide a diverse range of vehicle services that involve wireless communication to and/or from the vehicle. Such services may include: semi-autonomous or fully-autonomous vehicle operation and control; turn-by-turn directions and other navigation-related services that are provided in conjunction with the GNSS receiver 22; airbag deployment notification and other emergency or roadside assistance-related services that are provided in connection with one or more collision sensor interface modules such as BCM 26; diagnostic reporting using one or more diagnostic modules; and/or infotainment-related services where music, webpages, movies, television programs, videogames and/or other information is downloaded by an infotainment module (not shown) and is stored for current or later playback. The above-listed services are by no means an exhaustive list of all of the capabilities of the wireless communications device 30, but are simply an enumeration of some of the services that the wireless communications device may be capable of offering. Furthermore, it should be understood that at least some of the aforementioned modules could be implemented in the form of software instructions saved internal or external to the wireless communications device 30. The aforementioned modules could be hardware components located internal or external to the wireless communications device 30, or they could be integrated and/or shared with each other or with other systems located throughout the vehicle 12, to cite but a few possibilities. In the event that the modules are implemented as the VSMs 28 located external to the wireless communications device 30, they could utilize the vehicle bus 40 to exchange data and commands with the wireless communications device 30.

The vehicle's electronics 20 also include a number of vehicle user interfaces that provide vehicle occupants with a means of interacting with the vehicle electronics 20 to carry out vehicle functions and to provide and/or receive information. Some of these are shown in FIG. 1. For example, the vehicle electronics 20 includes an audio system 42 for presenting music and infotainment in the vehicle, as well as a microphone 44 and one or more pushbuttons 46 that are part of the wireless communications device 30. As used herein, the term "vehicle user interface" broadly includes any suitable form of human-machine interface (HMI), including both hardware and software components, which is located on the vehicle and enables a vehicle user to communicate with or through a component of the vehicle. The pushbutton(s) 46 allow manual user input into the wireless communications device 30 to provide other data, response, or control input. The microphone 44 provides audio input to the wireless communications device 30 to enable the driver or other occupant to provide voice commands and/or carry out hands-free calling via the wireless carrier system 70. For this purpose, it can be connected to an on-board automated voice processing unit known in the art. The audio system 42 provides audio output to a vehicle occupant and can be a dedicated, stand-alone system or part of a more extensive infotainment system. According to the particular embodiment shown here, the audio system 42 is operatively coupled to both the vehicle bus 40 and an entertainment bus (not shown) and may provide AM, FM, and satellite radio, CD, DVD and other multimedia functionality. This functionality can be provided in conjunction with or independent of an infotainment module.

Apart from the specific vehicle systems modules discussed herein (e.g., 22, 24, 26, 30, 42), the vehicle can also include other VSMs 28 in the form of electronic hardware components that are located throughout the vehicle and which may receive input from one or more sensors and use the sensed input to perform diagnostic, monitoring, control, reporting, and/or other functions. For example, the other VSMs 28 may include a center stack module (CSM), an infotainment unit, a powertrain control module, and/or a transmission control unit. Each of the VSMs 28 can be connected by the communications bus 40 to the other VSMs 28 as well as to the wireless communications device 30 and can be programmed to run vehicle system and subsystem diagnostic tests. One or more of the VSMs 28 may periodically or occasionally have its software or firmware updated and, in some embodiments, such vehicle updates may be over the air (OTA) updates that are received from the computer 78 or the remote facility 80 via the land network 76 and/or the wireless communications device 30. As is appreciated by those skilled in the art, the above-mentioned VSMs 28 are only examples of some of the modules that may be used in the vehicle 12, as numerous others are also possible.

The vehicle electronics 20 include a number of other components and modules that work with the silent vehicle alarm (SVA) module 24 to enable the integrated silent alarm system and its method 200. Those include various driver input devices that may be situated at or within reach from the driver's seat. These driver input devices are manually actuatable input devices that each have a primary control function for carrying out an associated primary vehicle function. In particular, each of the input devices is provided on the vehicle to control some aspect of the vehicle state or operation, such as seat position, side mirror position, cruise control settings, radio settings, braking, lighting, etc. Thus, for example, a radio mute button 48 has a primary control function of enabling or disabling sound from the audio system 42 in the vehicle. It may be used by the vehicle operator to carry out a primary vehicle function of permitting or blocking the sound when activated by the operator. As another example, a seat adjustment switch 50 has a primary control function of activating a motor in the seat to carry out a primary vehicle function of moving the seat or a portion thereof. As yet another example, a brake pedal switch/sensor 52 has a primary control function of activating vehicle brakes to carry out a primary vehicle function of slowing down the vehicle 12. FIG. 1 includes additional manually actuatable input devices, including steering wheel mounted switches 54, door mounted switches 56, as well as a number of other conventional switches 58 that include dashboard mounted switches, steering column mounted switches, center console mounted switches. The manually actuatable input devices also include an interior vehicle camera 60 and a gesture/touchscreen input device 62. The telematics unit's microphone 44 and pushbutton 46 are also manually actuatable input devices that may be used to provide the silent alarm sequence. All of these OEM-installed input devices may be used by a driver or other vehicle occupant to provide input to the vehicle, and each has a primary control function for carrying out an associated primary vehicle function.

Apart from their primary control function, the input devices 44-62 are used in conjunction with the SVA module 24 to carry out a secondary control function of enabling the driver or other occupant to input a silent alarm sequence using a predetermined sequence of activations of one or more of the input devices 44-62. Not all of the input devices 44-62 need be used for, or available to be used for, entering the silent alarm sequence. Similarly, other input devices not shown may be used in addition to or in lieu of those illustrated in FIG. 1. As will be appreciated, by leveraging the use of existing input devices that have a separate primary vehicle function and that are accessible by the SVA module 24, either over the communications bus 40 or otherwise, the input devices provide a dual function of enabling the vehicle occupant to carry out the primary vehicle function associated with the manually actuatable input device as well as the secondary function of enabling the vehicle occupant to enter the silent alarm sequence. This also has the advantage that the vehicle 12 therefore provides an integrated silent vehicle alarm system that requires no new hardware to be incorporated into the A-surfaces of the vehicle interior. And in some embodiments, no new hardware may be needed at all, as the SVA module 24 may be implemented using another existing vehicle module, such as BCM 26, such that only a software change is needed to implement the silent vehicle alarm functionality described below in connection with FIGS. 2 and 3.

The manually actuatable input devices 44-62 generally fall into two types of devices—manually manipulatable input devices such as switches 46-58 and proximity or other non-contact type sensors such as microphone 44, camera 60, and gesture input device 62 (which may also have touch-screen input capabilities). For the manually manipulatable input devices shown in FIG. 1. (e.g., door mounted switches, seat mounted switches, dashboard mounted switches, steering column mounted switches, steering wheel mounted switches, center console mounted switches, pedal switches), the silent alarm sequence comprises a predetermined sequence of activations of one or more of the switches. For the non-contact sensor input devices, the silent alarm sequence comprises physical movement or sound from the vehicle occupant that is detected using the microphone 44, vehicle interior camera 60, the gesture input device 62, or any combination of these.

Thus, to enter the silent alarm sequence into the vehicle 12, such as during an attempted robbery or carjacking, the occupant may quickly and inconspicuously enter the predetermined sequence of input device activations. Some input devices in the vehicle are better suited for this than others. For example, use of the vehicle horn may not be advisable for use as part of the silent alarm sequence, nor the headlight switch. Other switches are more suitable; for example, one of the door mounted switches used to toggle control of side mirror position between the left and right side mirrors, or a lumbar support activation switch mounted on the lower side of the driver seat bottom. These more inconspicuous switch activations may be used to surreptitiously enter the silent alarm sequence without being noticed by the assailant. Similarly, use of the camera 60 or gesture input device 62 may be used to recognize certain discrete facial, head, or hand signaling that operates as the silent alarm sequence. And, any of these inputs may be used in combination, either by providing sequential or simultaneous inputs to two or more of the input devices 44-62.

For example, the silent alarm sequence may require that a window button be pressed and then a switch or button on the center console to be depressed, or a sequence of a window button, then brake pedal, then cruise control. In another embodiment the silent alarm sequence may include simultaneous activations of at least of the manually actuatable devices 44-62. For example it may require that the vehicle occupant press down on the brake pedal while pressing the cruise control set button several times, or to press two window buttons at the same time, or press on the brake pedal and one window button at the same time. The silent alarm sequence may require any number of combinations of activations.

The switch-type input devices 42 and 48-58 may be implemented using conventional vehicle switches of various sorts, as are known in the industry. Similarly, the non-contact input devices 44, 60, 62 may be implemented using conventional components and software. The camera 60 may be any suitable visible, IR, or other camera that monitors driver or other interior occupant behavior, with suitable image processing to extract significant visual features from the recorded video. The gesture/touchscreen input device 62 may be a capacitive-based sensor and display that detects human proximity, such as hand gestures in front of the screen, as is known to those skilled in the art.

Figure 2:
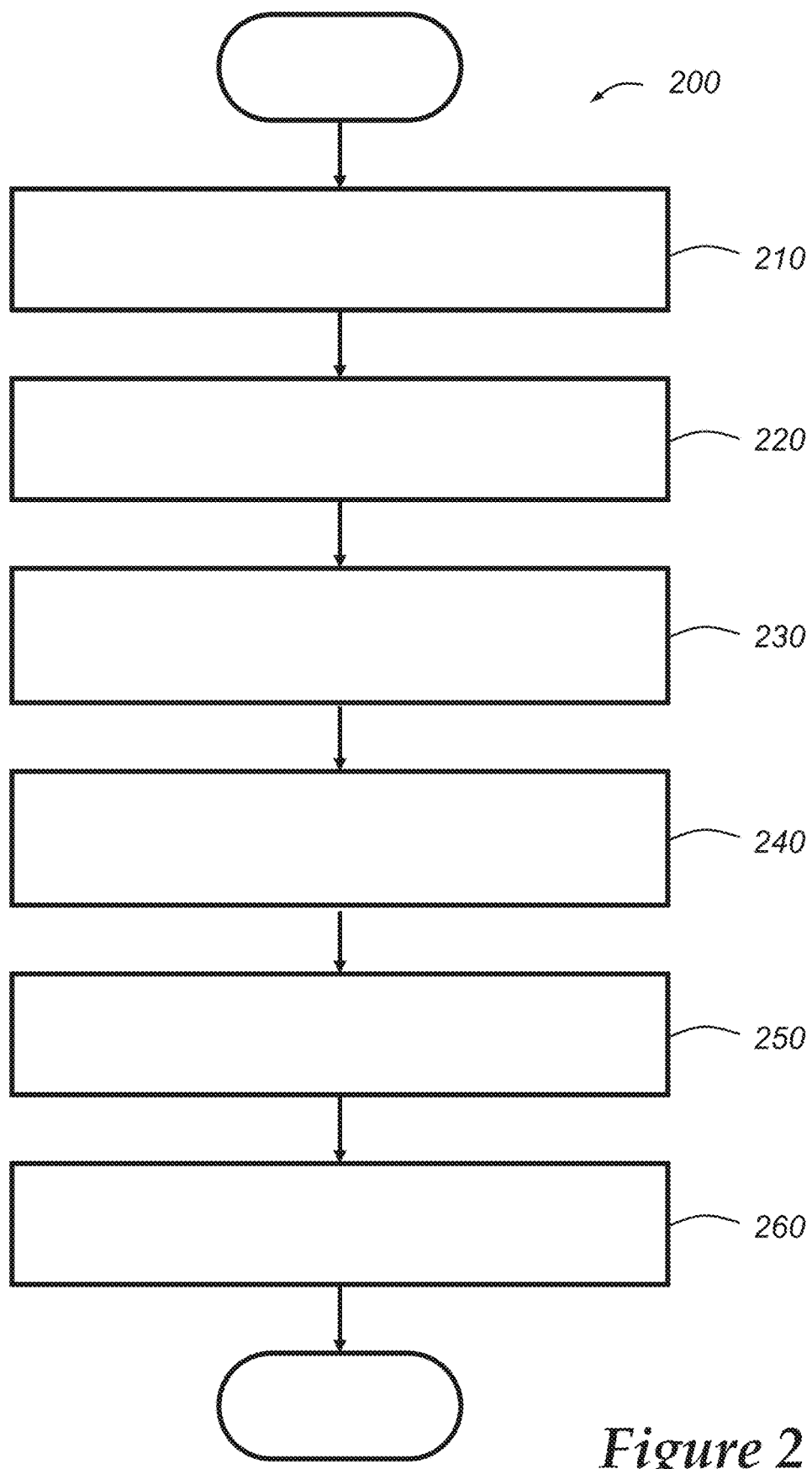
FIG. 2 is a flowchart illustrating an embodiment of a method of triggering a silent vehicle alarm.
Figure 3:
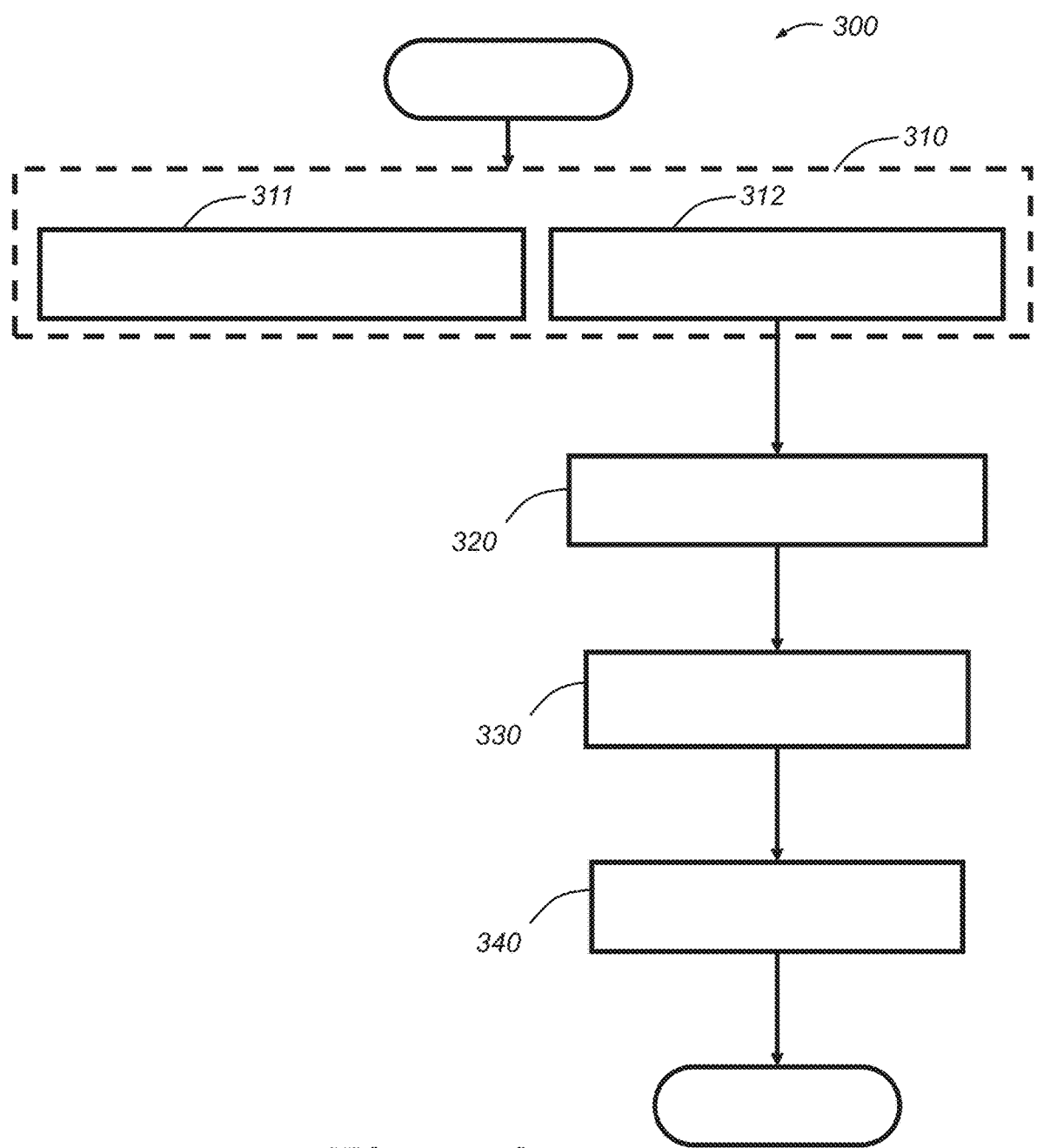
FIG. 3 is a flowchart illustrating an embodiment of a method of storing a silent alarm sequence in a vehicle for use in the method of FIG. 2.

FIG. 2 is a flowchart of a method 200 for triggering a silent vehicle alarm in response to receiving a silent alarm sequence inputted by an occupant of vehicle 12. This silent alarm sequence is a predetermined sequence of activations of one or more of the input devices 44-62, and this predetermined sequence may be programmed by the OEM, the dealer, or the customer (e.g., driver) after delivery of the vehicle. FIG. 3 discussed below provides a method of programming this predetermined sequence.

At step 210, the silent alarm sequence is stored in the vehicle so that it can later be checked against inputted sequences by the SVA module 24. This silent alarm sequence is a sequence of activations of one or more of the input devices 44-62 that are preset, or predetermined, by storing them in the vehicle. As discussed farther below, the sequence may be stored in the vehicle either by the OEM initially when the vehicle is made, or by a dealer in preparation for, or at delivery, or subsequently by the customer or driver. Once the silent alarm sequence is stored at the vehicle, it may be transmitted via the wireless communication device 30 to the remote facility 80 or the computer 78 or otherwise where it may be associated with a customer profile in order to quickly access information that will aid in providing emergency services. Such information may include color, make and model of the vehicle, vehicle identification number, license plate information, name of vehicle user and any other useful information.

Once the silent alarm sequence is stored at the vehicle 12, then subsequently during use of the vehicle by the driver or other vehicle occupant, the vehicle 12 may receive an input sequence from the occupant via one or more of the manually actuatable input devices 44-62. This is shown at step 220. Given that the occupant will typically use one or more of the input devices 44-62 for their normal, primary control functions, the SVA module 24 may, in some embodiments, continuously monitor these input devices to detect the silent alarm sequence. This can be done based on the stored silent alarm sequence wherein the SVA module 24 can continuously monitor for activation of the first input device used in the sequence and upon detecting it, compare subsequent activations of that input device or others to determine if the stored sequence is entered. Other approaches for monitoring for the silent alarm sequence will become apparent to those skilled in the art.

Thus, in the event that the vehicle occupant comes under attack while in the vehicle and needs to signal for help, s/he may input the silent alarm sequence using the one or more manually actuatable devices 44-62. By using the manually actuatable devices located within the vehicle and within easy reach of the vehicle occupant, the assailant in an instance such as car-jacking or road-rage assault will not readily notice the movements of the vehicle occupant. For instance if the silent alarm sequence were programmed to include pressing down on the brake pedal 52 three times while simultaneously depressing the cruise control set button, the assailant may not notice the movement of the driver's foot. Once the vehicle has detected and received the input sequence from the occupant, the process moves to block 230.

At step 230, the received input sequence from step 220 is compared to the stored silent alarm sequence to determine if they match. For this purpose steps 220 and 230 may be combined and done simultaneously or otherwise carried out continuously or repetitively each time a sequence of inputs are received that begin with the first input of the stored silent alarm sequence. That is, if the silent alarm sequence begins with a brake pedal activation, then the SVA module 24 can monitor for brake pedal actuations and begin monitoring subsequent inputs each time a brake pedal activation occurs, using step 230 to compare those inputs to the stored silent alarm sequence. In this way, a valid inputted silent alarm sequence may be detected as soon as it occurs.

Once a valid sequence is detected, then at step 240 the vehicle electronics system may provide the vehicle occupant with a confirmatory indicator that the silent alarm signal was transmitted or was both successfully transmitted and received by a remote facility. Determining a successful receipt by the remote facility 80 may be accomplished by communications handshaking or receipt of a success acknowledgement. This confirmatory indicator may be a predetermined visible, audible, or tactile notification that is substantially unnoticeable if at all from outside the vehicle. The confirmatory indicator serves to reassure the vehicle occupant that his/her call for help has been sent. The confirmatory indicator may be for example, a seat vibration, a flashing of the change oil light or a ping sound, just to name a few. This confirmatory signal may also alert the vehicle occupant if they have inadvertently triggered the silent vehicle alarm and allow them the opportunity to contact the remote facility and notify the operator that it was a false alarm.

At step 250, a silent alarm notification is transmitted from the vehicle 12 to the remote facility 80, to PSAP 82, or elsewhere. This may be carried out using an suitable wireless communication path, including by way of the wireless communications device 30 via the cellular network 70 or otherwise.

Then, in step 260, the remote facility 80, if it received the silent alarm notification, can send an alarm notification to the PSAP 82 for dispatch of emergency services. Steps 250 and 260 may also include the provision of vehicle location from the vehicle 12 using the GNSS module 22 so that the remote facility 80 and/or PSAP 82 may perform vehicle tracking. Commands and information may also be sent back to the vehicle, including, for example, a disable command that causes the vehicle 12 to slow down or stop so as to aid police in apprehending a car thief.

Thus, in at least some embodiments, once the silent alarm sequence has be entered by the vehicle occupant, verified, and an alarm notification transmitted to the remote facility 80, the vehicle 12 may then also transmit location and identification information to the remote facility 80 or PSAP 82. The location information may be coordinates, streets, approximate address, exact address, and the unique identifiers could be information such as the vehicle identification number, license plate, name of the individual to which the vehicle is registered, just to name a few. Additionally, as mentioned above it is also possible for the silent alarm sequence or the received vehicle information (e.g., VIN) to be tied to a customer profile that provides identifying information such as the vehicle make, license plate number, or vehicle identification number at the remote facility so that this information may be conveyed to emergency responders. In this way, the emergency responders may be quickly dispersed to the appropriate location and identify the vehicle where the vehicle occupant is located and under attack.

FIG. 3 is a flowchart of the process for programming or setting the silent alarm sequence. Two options for this are shown; namely, programming it in by the OEM as a part of the original manufacturing of the vehicle 12, or by the customer or other vehicle user so as to allow users to select a custom sequence that may work best for them. Other alternative programming approaches may be used, such as by having the silent alarm sequence set by a dealer as a part of vehicle delivery to the initial customer.

Initially, at step 310, the silent alarm sequence is stored in the vehicle. This may be done at Step 311 by programming or other pre-storing of the silent alarm sequence by the OEM. This provides at least a default silent alarm sequence such that no initial input is required by the customer. The sequence may be a single one that is used across a number of vehicles produced by the OEM, or may be a unique or random sequence so that different vehicles have different default sequences. This may be stored in the SVA module 24 either as a part of its initial programming or may be manually entered after placing the SVA module 24 in a learn mode.

Rather than or after initial programming of the silent alarm sequence by the OEM, the vehicle user instead may program the sequence, as indicated at step 312. This may be done by placing the vehicle, and the SVA module 24 in particular, into a learn mode so that the user may enter the sequence by using the manually actuatable input devices 44-62. The learn mode may be entered in any suitable way, such as by the user entering an alarm setting command. This may be done by accessing a settings menu via the screen input device 62 and selecting a learn mode menu option. Alternatively, this may be done by the user entering a master security code (e.g., through input device 62) that then enables them to enter their chosen silent alarm sequence. Thus, as step 320 the vehicle enters the learn mode in one of these manners.

At step 330 the user enters the silent alarm sequence. For the manually manipulatable input devices 46-58, this may involve a sequential or simultaneous (or a combination of both) activations of one or more of the input devices, and preferably, using two or more of the input devices. For the non-contact sensors such as microphone 44, vehicle interior camera 60, or gesture input device 62, the sequence may involve gestures or words or other audible sounds, either alone or in combination with other non-contact inputs or with an activation of one or more of the input devices 46-58. Once entered, the user may indicate the sequence is complete by confirming via a separate touchscreen or audible input, such as by using input device 62 or microphone 44. To ensure a proper silent alarm sequence, certain sequence validations and constraints may be implemented, such as ensuring a sufficiently distinct sequence that will not likely be inadvertently entered. Thus, in one embodiment, the system may only accept a new silent alarm sequence that involves simultaneous activations of the input devices 44-62 that would not normally be carried out when using the input devices for their primary functions. For example, a sequence involving depressing the brake pedal while pressing the cruise control set button three times may be accepted as a valid sequence because the operator would not normally perform this sequence, as it would not work to carry out any vehicle cruise control function; whereas a sequence of pressing the brake pedal while pressing the cruise control off button three times may not be accepted because a driver may do both at the same time during driving to disable cruise control.

Once entered and confirmed, the silent alarm sequence is stored at step 340 in the SVA module 24. It may also be provided to the central facility 80 or other remote storage, if desired. The learn mode may then be entered subsequently if there is a need or desire to change to a new silent alarm sequence.

In one embodiment, the method steps 210-250 and the method 300 can be implemented in a computer program (or "application") such as would be resident in memory on the vehicle. The server program may be embodied in a non-transitory, computer readable medium and including instructions usable by one or more processors of one or more computers of one or more systems. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media (such as memory 38 and/or memory in BCM 24), which can be non-transitory so that they are stored even in the absence of applied power. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method of triggering a silent vehicle alarm by an occupant of a vehicle having original equipment manufacturer (OEM)-installed vehicle electronics that include a plurality of manually actuatable input devices, each of which has a primary control function for carrying out an associated primary vehicle function, the method comprising the steps of:
   (a) storing in the vehicle electronics a silent alarm sequence that triggers the silent vehicle alarm, the silent alarm sequence comprising a predetermined sequence of activations of one or more of the manually actuatable input devices, wherein step (a) further comprises receiving, after customer delivery of the vehicle, an alarm setting command from a vehicle user, followed by receiving the silent alarm sequence from the vehicle user via the one or more manually actuatable input devices; and
   subsequently, during use of the vehicle by a vehicle occupant:
   (b) receiving an input sequence from the vehicle occupant using the one or more manually actuatable input devices;
   (c) comparing the received input sequence to the silent alarm sequence; and
   (d) in response to determining that the received input sequence matches the silent alarm sequence, then wirelessly transmitting a silent alarm notification from the vehicle using the vehicle electronics;
   wherein each of the one or more manually actuatable input devices of the OEM-installed vehicle electronics that are used to receive the silent alarm sequence provides a dual function of enabling the vehicle occupant to carry out the primary vehicle function associated with the manually actuatable input device and enabling the vehicle occupant to enter the silent alarm sequence.

2. The method of claim 1, wherein the one or more manually actuatable input devices comprise one or more manually manipulatable input devices selected from the group consisting of: door mounted switches, seat mounted switches, dashboard mounted switches, steering column mounted switches, steering wheel mounted switches, center console mounted switches, or pedal switches, and wherein the silent alarm sequence comprises a predetermined sequence of activations of one or more of the switches.

3. The method of claim 2, wherein the silent alarm sequence comprises a predetermined sequence of activations of two or more of the switches.

4. The method of claim 3, wherein the silent alarm sequence includes simultaneous activations of at least two of the switches.

5. The method of claim 1, wherein the one or more manually actuatable input devices includes a microphone, vehicle interior camera, and/or a gesture input device within the vehicle, and wherein the predetermined sequence of activations comprises physical movement or sound from the vehicle occupant that is detected using the microphone, vehicle interior camera, and/or the gesture input device.

6. The method of claim 1, wherein step (d) further comprises wirelessly providing location data indicative of the vehicle's location and vehicle identification information that uniquely identifies the vehicle.

7. A method of triggering a silent vehicle alarm by an occupant of a vehicle having original equipment manufacturer (OEM)-installed vehicle electronics that include a plurality of manually actuatable input devices, each of which has a primary control function for carrying out an associated primary vehicle function, the method comprising the steps of:
   (a) storing in the vehicle electronics a silent alarm sequence that triggers the silent vehicle alarm, the silent alarm sequence comprising a predetermined sequence of activations of one or more of the manually actuatable input devices; and
   subsequently, during use of the vehicle by a vehicle occupant:
   (b) receiving an input sequence from the vehicle occupant using the one or more manually actuatable input devices;
   (c) comparing the received input sequence to the silent alarm sequence;
   (d) in response to determining that the received input sequence matches the silent alarm sequence, then wirelessly transmitting a silent alarm notification from the vehicle using the vehicle electronics; and
   (e) after step (d), providing the vehicle occupant with a confirmatory indicator that the silent vehicle alarm was transmitted or was both transmitted and successfully received by a remote facility, the confirmatory indicator comprising a predetermined visible, audible, or tactile notification that is substantially unnoticeable from outside the vehicle;
   wherein each of the one or more manually actuatable input devices of the OEM-installed vehicle electronics that are used to receive the silent alarm sequence provides a dual function of enabling the vehicle occupant to carry out the primary vehicle function associated with the manually actuatable input device and enabling the vehicle occupant to enter the silent alarm sequence.

8. A vehicle having original equipment manufacturer (OEM)-installed vehicle electronics that include a vehicle system module having an electronic processor and memory that is accessible by the processor and that stores a computer program for execution by the processor, the vehicle electronics further including a plurality of manually actuatable input devices, each of which has a primary control function for carrying out an associated primary vehicle function and each of which provides an input that is received by the vehicle system module, wherein the vehicle system module is configured to execute the computer program using the processor so as to:
   (a) store in the vehicle electronics a silent alarm sequence that triggers a silent vehicle alarm, the silent alarm sequence comprising a predetermined sequence of activations of one or more of the manually actuatable input devices; and (b) receive, after customer delivery of the vehicle, an alarm setting command from a vehicle user, followed by receiving the silent alarm sequence from the vehicle user via the one or more manually actuatable input devices; and subsequently, during use of the vehicle by a vehicle occupant:

(c) receive an input sequence from the vehicle occupant using the one or more manually actuatable input devices;

(d) compare the received input sequence to the silent alarm sequence; and (e) in response to determining that the received input sequence matches the silent alarm sequence, then wirelessly transmit a silent alarm notification from the vehicle using the vehicle electronics;

wherein each of the one or more manually actuatable input devices of the OEM-installed vehicle electronics that are used to receive the silent alarm sequence provides a dual function of enabling the vehicle occupant to carry out the primary vehicle function associated with the manually actuatable input device and enabling the vehicle occupant to enter the silent alarm sequence.

\* \* \* \* \*